(12) United States Patent
Huang

(10) Patent No.: US 11,170,198 B2
(45) Date of Patent: Nov. 9, 2021

(54) FINGERPRINT IDENTIFICATION METHOD AND DEVICE, STORAGE MEDIUM AND TERMINAL

(71) Applicant: Shanghai Harvest Intelligence Technology Co., Ltd., Shanghai (CN)

(72) Inventor: Jiandong Huang, Shanghai (CN)

(73) Assignee: Shanghai Harvest Intelligence Technology Co., Ltd., Shanghai (CN)

( * ) Notice: Subject to any disclaimer, the term of this patent is extended or adjusted under 35 U.S.C. 154(b) by 55 days.

(21) Appl. No.: 16/705,693

(22) Filed: Dec. 6, 2019

(65) Prior Publication Data

US 2020/0184182 A1 Jun. 11, 2020

(30) Foreign Application Priority Data

Dec. 7, 2018 (CN) .......................... 201811491875.0

(51) Int. Cl.
G06K 9/00 (2006.01)
(52) U.S. Cl.
CPC ......... G06K 9/0012 (2013.01); G06K 9/0004 (2013.01)
(58) Field of Classification Search
CPC .......................... G06K 9/00107; G06K 9/0012
See application file for complete search history.

(56) References Cited

U.S. PATENT DOCUMENTS

| | | | | |
|---|---|---|---|---|
| 8,605,961 | B2* | 12/2013 | Schuler | G06K 9/00006 382/124 |
| 10,303,921 | B1* | 5/2019 | He | G02F 1/13338 |
| 2013/0194236 | A1* | 8/2013 | Gu | G06K 9/00107 345/175 |
| 2014/0168167 | A1* | 6/2014 | Chou | G06K 9/00026 345/175 |
| 2016/0180139 | A1* | 6/2016 | Hung | A61B 5/1172 382/124 |
| 2016/0314334 | A1* | 10/2016 | He | G06K 9/0004 |
| 2016/0328090 | A1* | 11/2016 | Klinghult | G09G 3/32 |
| 2017/0300738 | A1* | 10/2017 | Li | G06K 9/00087 |
| 2018/0322328 | A1* | 11/2018 | Pang | A61B 5/117 |
| 2020/0279090 | A1* | 9/2020 | He | G06K 9/00087 |

* cited by examiner

*Primary Examiner* — John B Strege
(74) *Attorney, Agent, or Firm* — Harness, Dickey & Pierce, P.L.C.

(57) ABSTRACT

A fingerprint identification method and device, a storage medium and a terminal are provided. The method includes: when a touch sensing unit senses a touch signal after a screen is touched by a fingerprint to be identified, a control unit sending a display drive signal to a display unit to light pixels of one or more discrete point light source regions in the display unit; and a photoelectric sensing unit receiving a scattered light signal formed by light from the pixels reaching a physiological tissue of a finger having the fingerprint to be identified, and a total reflection light signal formed by light from the pixels reaching the screen. True or false fingers may be easily identified and determined, which enhances security and reliability of a fingerprint identification system, and also ensures and improves quality of fingerprint imaging.

9 Claims, 5 Drawing Sheets

FINGERPRINT IDENTIFICATION METHOD AND DEVICE, STORAGE MEDIUM AND TERMINAL

CROSS-REFERENCE TO RELATED APPLICATIONS

The present application claims priority to Chinese patent application No. 201811491875.0, filed on Dec. 7, 2018, and the entire disclosure of which is incorporated herein by reference.

TECHNICAL FIELD

The present disclosure generally relates to a fingerprint identification method and device, a storage medium and a terminal.

BACKGROUND

With the rapid development of information technology, fingerprint identification technology has gradually developed and been widely used in mobile terminals (such as mobile phones, tablet computers or the like), banking systems and attendance systems.

However, with the advancement of technology, some fake fingerprints made of materials such as conductive silica gel have appeared. Existing fingerprint identification systems hardly distinguish a simulated fingerprint film from a human living fingerprint, thereby reliability of fingerprint identification is greatly reduced.

SUMMARY

An embodiment of the present disclosure provides a fingerprint identification method and device, a storage medium and a terminal. By embodiments of the present disclosure, true or false fingers may be easily identified and determined, which enhances security and reliability of a fingerprint identification system, and also ensures and improves quality of fingerprint imaging.

In an embodiment of the present disclosure, a fingerprint identification method is provided, including: when a touch sensing unit senses a touch signal after a screen is touched by a fingerprint to be identified, a control unit sending a display drive signal to a display unit to light pixels of one or more discrete point light source regions in the display unit; and a photoelectric sensing unit receiving a scattered light signal formed by light from the pixels reaching a physiological tissue of a finger having the fingerprint to be identified, and a total reflection light signal formed by light from the pixels reaching the screen.

Optionally, if an incident angle of the light from the pixels is smaller than a critical angle θ of total reflection, the light enters the physiological tissue of the finger through the screen and is scattered, and a part of the light returns, to form the scattered light signal, and the scattered light signal is received by the photoelectric sensing unit and analyzed to obtain a heart rate blood oxygen value.

Optionally, the method further includes: determining whether the fingerprint to be identified is a living fingerprint based on the heart rate blood oxygen value.

Optionally, wavelength of scattered light is greater than 600 nm, preferably 600 to 1000 nm, more preferably 600 to 800 nm.

Optionally, if an incident angle of the light from the pixels is greater than or equal to a critical angle θ of total reflection, total reflection occurs to form the total reflection light signal, and the total reflection light signal is received by the photoelectric sensing unit and analyzed to reconstruct an entire image of the fingerprint to be identified.

Optionally, the method further includes: determining whether the image of the fingerprint to be identified is consistent with a standard fingerprint image.

Optionally, if the fingerprint to be identified is determined as a living fingerprint based on a heart rate blood oxygen value, and an image of the fingerprint to be identified is determined to be consistent with a standard fingerprint image, fingerprint identification is successful; otherwise, the fingerprint identification is failed.

In an embodiment of the present disclosure, a fingerprint identification device is provided, including a screen, a touch sensing unit, a display unit, a photoelectric sensing unit and a control unit, wherein the screen is configured to be touched by a fingerprint to be identified, the touch sensing unit is configured to sense a touch signal of the fingerprint to be identified, the display unit is provided with pixels of one or more discrete point light source regions, the photoelectric sensing unit is configured to receive a scattered light signal formed by light from the pixels reaching a physiological tissue of a finger having the fingerprint to be identified, and a total reflection light signal formed by light from the pixels reaching the screen, and the control unit is configured to send a display drive signal to the display unit to light the pixels of the one or more discrete point light source regions in the display unit, when the touch sensing unit senses the touch signal.

Optionally, if an incident angle of the light from the pixels is smaller than a critical angle θ of total reflection, the light enters the physiological tissue of the finger through the screen and is scattered, and a part of the light returns, to form the scattered light signal, and the scattered light signal is received by the photoelectric sensing unit and analyzed to obtain a heart rate blood oxygen value.

Optionally, if an incident angle of the light from the pixels is greater than or equal to a critical angle θ of total reflection, total reflection occurs to form the total reflection light signal, and the total reflection light signal is received by the photoelectric sensing unit and analyzed to reconstruct an entire image of the fingerprint to be identified.

In an embodiment of the present disclosure, a terminal including the above fingerprint identification device is provided.

In an embodiment of the present disclosure, a computer readable storage medium having computer instructions stored therein is provided, where once the computer instructions are executed, the above method is performed.

In an embodiment of the present disclosure, a terminal including a memory and a processor is provided, wherein the memory has computer instructions stored therein, and when the processor executes the computer instructions, the above method is performed.

In an embodiment of the present disclosure, a terminal including a memory and a processor is provided, wherein the memory has computer instructions stored therein, and when the processor executes the computer instructions, the above fingerprint encryption or fingerprint decryption method is performed.

By embodiments of the present disclosure, whether the fingerprint to be identified is a living fingerprint is determined rapidly, and whether the image of the fingerprint to be identified is consistent with a standard fingerprint image is determined to obtain a matching result rapidly, which may easily identify true or false fingers, thereby enhancing security and reliability of a fingerprint identification system and greatly improving user experience.

BRIEF DESCRIPTION OF THE DRAWINGS

In order to clarify solutions of the present disclosure, embodiments of present disclosure will be described in detail in conjunction with accompanying drawings, while the accompanying drawings do not limit the solutions of the present disclosure.

DETAILED DESCRIPTION

As described in the background, fingerprint identification has been widely used in terminals for wake-up (unlocking), payment and user identification (attendance). However, some fake fingerprints made of materials such as conductive silica gel have appeared, which seriously affects daily life and work. Therefore, a fingerprint identification method and device, a storage medium and a terminal are provided in embodiments of the present disclosure. By embodiments of the present disclosure, true or false fingers may be easily identified and determined, which enhances security and reliability of a fingerprint identification system, and also ensures and improves quality of fingerprint imaging.

In order to clarify the object, solutions and advantages of embodiments of the present disclosure, embodiments of present disclosure will be described clearly in detail in conjunction with accompanying drawings.

Figure 1:
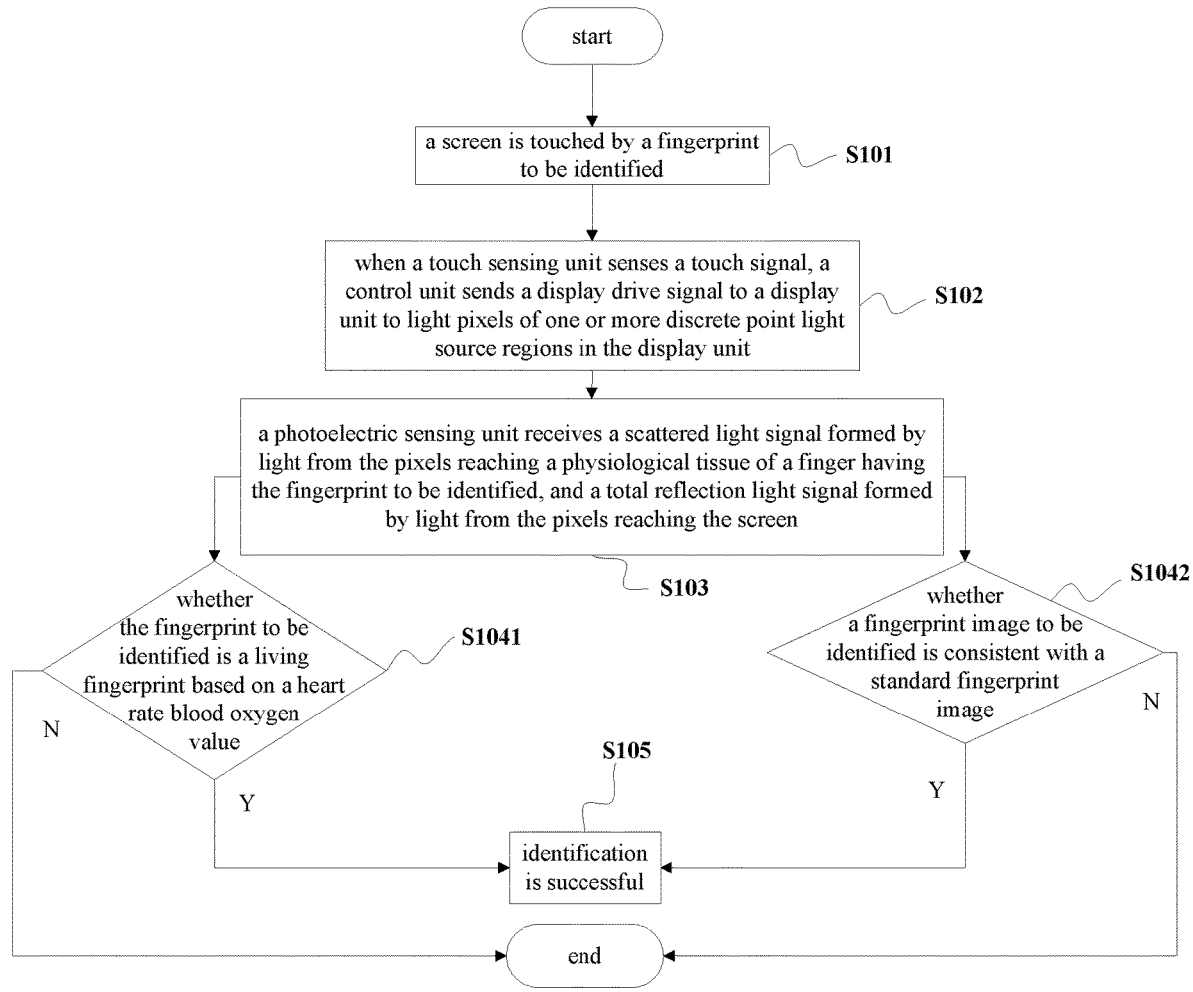
FIG. 1 schematically illustrates a flow chart of a fingerprint identification method according to an embodiment.
Figure 2:
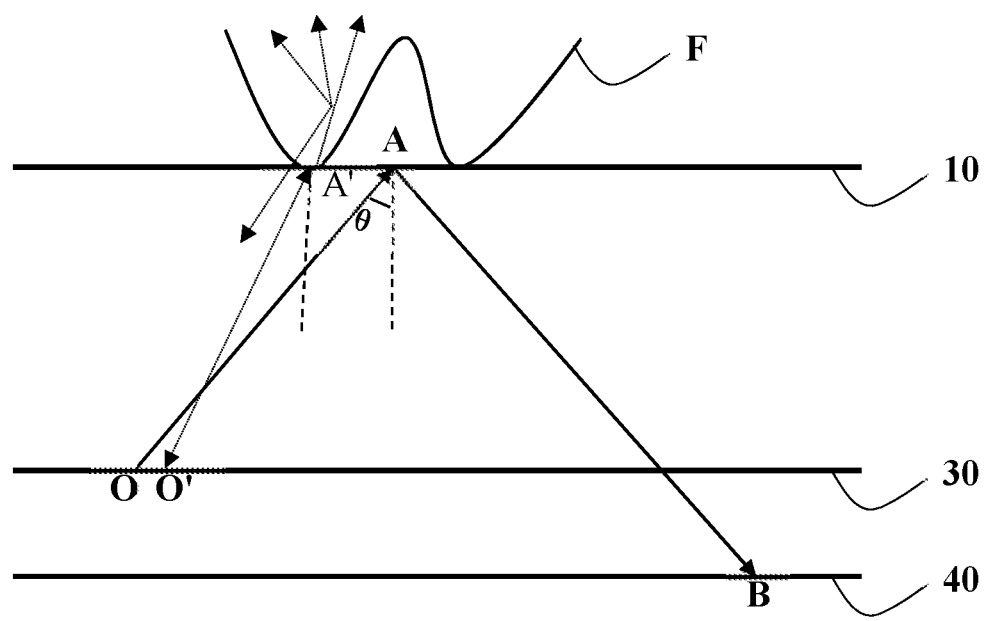
FIG. 2 schematically illustrates a diagram of optical fingerprint imaging according to an embodiment.

Referring to FIGS. 1 and 2, FIG. 1 schematically illustrates a flow chart of a fingerprint identification method according to an embodiment, and FIG. 2 schematically illustrates a diagram of optical fingerprint imaging by employing the method shown in FIG. 1. The method includes S101, S102, S103, S1041, S1042 and S105.

In S101, a screen 10 is touched by a fingerprint F to be identified. In S102, when a touch sensing unit 20 senses a touch signal, a control unit 50 sends a display drive signal to a display unit 30 to light pixels of one or more discrete point light source regions in the display unit 30. In S103, a photoelectric sensing unit 40 receives a scattered light signal formed by light from the pixels reaching a physiological tissue of a finger having the fingerprint to be identified, and a total reflection light signal formed by light from the pixels reaching the screen.

In some embodiments, in S103, when light emitted from a pixel O' in the display unit 30 reaches the fingerprint F to be identified and a touch point A' on the screen 10, as the incident angle is smaller than the critical angle θ of total reflection, the light enters skin of the finger and is scattered, while a part of the light returns back, forming the scattered light signal (i.e., when the light passes through the physiological tissue of the fingerprint, one portion of the light is absorbed, the other portion is scattered to the photoelectric sensing unit 40, and thus the illumination is attenuated).

Studies have found that absorption of light by muscles, bones, veins and other connected tissues is essentially constant (provided that there is no large movement in a measured site), but the blood is different. As blood flows in an artery, absorption of light by the artery also changes naturally. Green light (with wavelength of about 530 nm) and yellow light (with wavelength of about 570 nm) entering the physiological tissue of the finger are mostly absorbed by erythrocytes, while red light and light close to IR (for example, with wavelength greater than 600 nm, preferably within a range from 600 nm to 1000 nm, more preferably within a range from 600 nm to 800 nm) are more prone to pass through the physiological tissue of the finger with a part of light being scattered to return back. Therefore, in embodiments of the present disclosure, the scattered light signal is received by the photoelectric sensing unit 40 and analyzed to obtain a heart rate blood oxygen value.

In some embodiments, in S103, when light emitted from a pixel O in the display unit 30 reaches the fingerprint F to be identified and a touch point A on the screen 10, as the incident angle is greater than or equal to the critical angle θ of total reflection, total reflection occurs to form the total reflection light signal. The total reflection light signal is received by the photoelectric sensing unit 40 and analyzed to reconstruct an entire image of the fingerprint to be identified.

In some embodiments, the method may further include S1041. In S1041, whether the fingerprint to be identified is a living fingerprint is determined based on the heart rate blood oxygen value. The heart rate blood oxygen value includes a heart rate value and a blood oxygen saturation. If it is detected that the heart rate value of the fingerprint to be identified falls within a first preset threshold range (for example, 60 to 100 times/min, for normal persons), it is determined that the fingerprint to be identified is a living fingerprint; otherwise, the method ends or it is determined that the fingerprint identification is failed. If it is detected that the blood oxygen saturation of the fingerprint to be identified falls within a second preset threshold range (for example, 94% to 100% for normal persons), the fingerprint to be identified is determined to be a living fingerprint; otherwise, the method ends or it is determined that the fingerprint identification is failed. In some special cases, due to physiological characteristics of individual persons, their heart rate and blood oxygen saturation may be slightly lower or slightly higher than the above threshold range. However, as long as an error range is within ±20%, in principle, the fingerprint to be identified may be determined to be a living fingerprint.

In some embodiments, the method may further include S1042. In S1042, whether the image of the fingerprint to be identified is consistent with a standard fingerprint image is determined.

In some embodiments, the method may further include S105. In S105, if the fingerprint to be identified is determined as a living fingerprint based on the heart rate blood oxygen value, and the image of the fingerprint to be identified is determined to be consistent with the standard fingerprint image, fingerprint identification is successful; otherwise, the fingerprint identification is failed.

Figure 3:
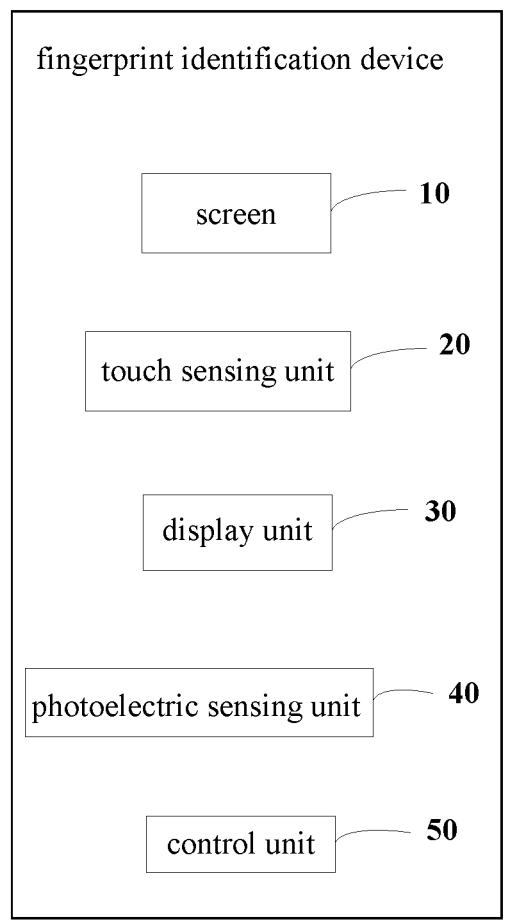
FIG. 3 schematically illustrates a block diagram of a fingerprint identification device according to an embodiment.

FIG. 3 schematically illustrates a block diagram of a fingerprint identification device according to an embodiment. The fingerprint identification device includes, from top to bottom, a screen 10, a touch sensing unit 20, a display unit 30, a photoelectric sensing unit 40 and a control unit 50. The screen 10 is configured to be touched by a fingerprint to be identified. The touch sensing unit 20 is configured to sense a touch signal of the fingerprint to be identified. The display unit 30 is provided with pixels of one or more discrete point light source regions. The photoelectric sensing unit 40 is configured to receive a scattered light signal formed by light from the pixels reaching a physiological tissue of a finger having the fingerprint to be identified, and a total reflection light signal formed by light from the pixels reaching the screen 10. The control unit 50 is configured to send a display drive signal to the display unit 30 to light the pixels of the one or more discrete point light source regions in the display unit 30, when the touch sensing unit 20 senses the touch signal.

Figure 4:
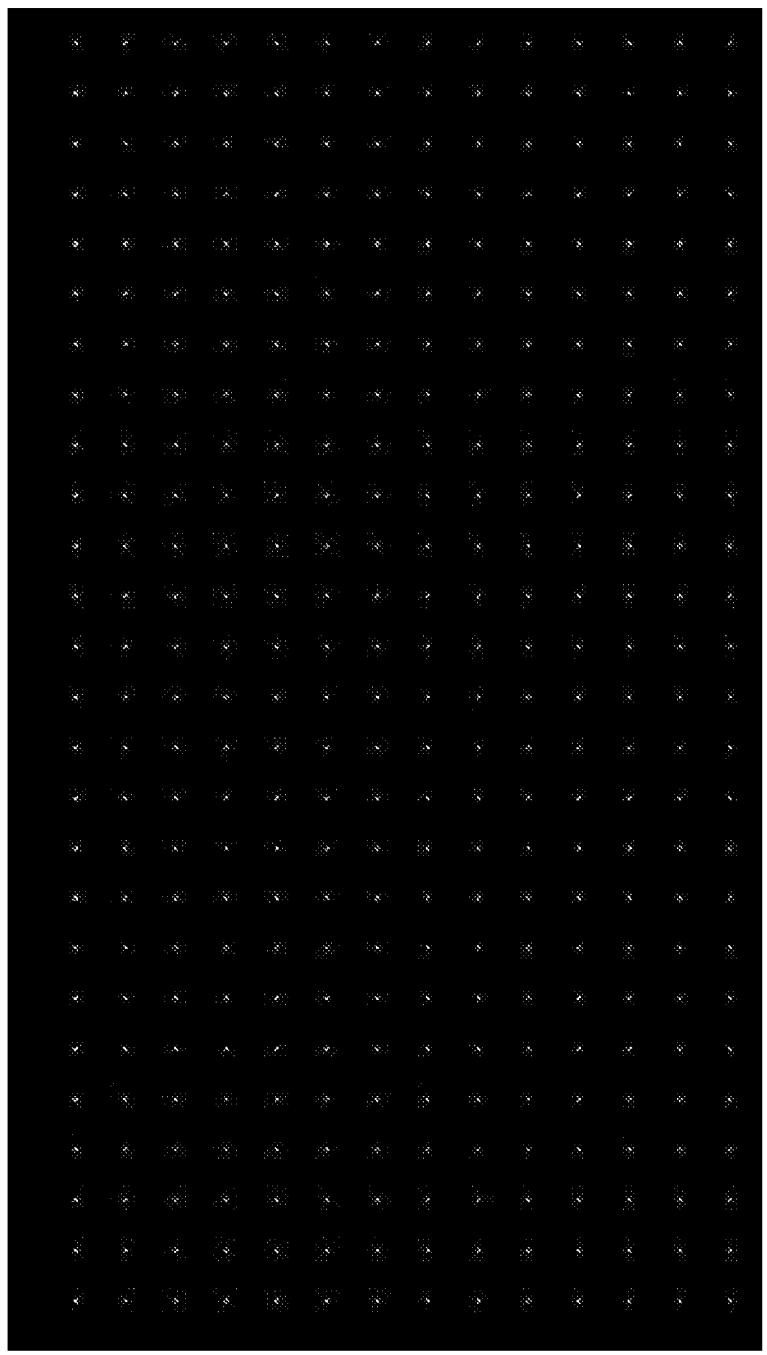
FIG. 4 schematically illustrates a diagram of an array in a plurality of discrete point light source regions in a display unit according to an embodiment.

In some embodiments, the pixels of the plurality of discrete point light source regions in the display unit 30 are arranged in array and are separated by non-lighted pixels (referring to FIG. 4). Light emitted from the plurality of discrete point light source regions can light a plurality of regions of the screen 10, and then reaches a surface of the screen 10 to form a total reflection light signal received by the photoelectric sensing unit 40, so that images of the plurality of regions can be acquired, which improves efficiency of image acquisition. Furthermore, the point light source regions include a plurality of pixels, which satisfies illumination brightness requirements of imaging, and thus realizes acquisition of the image of the fingerprint to be identified on the screen 10. In this way, availability of the acquired image is guaranteed.

In some embodiments, the point light sources have a plurality of arrangements, such as a topological arrangement, preferably a uniform arrangement, that is, the distance between any two point light sources is the same, such that images formed by reflections of light from the point light sources are all the same, which facilitates subsequent image processing. Specific form of the arrangement may include a lateral arrangement, a longitudinal arrangement, a lateral longitudinal cross arrangement, a circular arrangement, a single point arrangement, a multi-point arrangement, a linear arrangement, a parallel line arrangement, a ring arrangement, a dotted line arrangement or a parallel dotted line arrangement. By the lateral longitudinal cross arrangement, the plurality of point light sources constitute a plurality of parallel horizontal rows and a plurality of parallel longitudinal rows (as shown in FIG. 4).

An interval between the point light sources determines imaging quality. To avoid overlaps between images, the interval between two point light sources satisfies a condition that images corresponding to photoelectric signals generated by the photoelectric sensing unit 40 based on light emitted from the two point light sources subjected to total reflection do not contact or repeat. Preferably, the interval may be a minimum value under the above condition. The minimum value may be obtained by multiple manual trials. For example, images generated based on light emitted from the two point light sources subjected to total reflection under different intervals are acquired, and then a minimum value of the intervals which satisfy the above condition is selected to be pre-set on a memory which stores computer instructions for the method provided in embodiments of the present disclosure. In practice, the interval between two point light sources is affected by an interval between the display unit 30 and the screen 10, where the former interval is proportional to the latter interval. In practical applications, hardware parameters of a screen of a product generally do not change. For the screen, multiple manual trials are more direct and convenient for the determination of the interval.

As described above, in embodiments of the present disclosure, multiple pixels are combined to form a composite point light source whose brightness meets imaging requirements. Besides, a shape of the point light source also affects image quality. Preferably, the point light source region is circular. In practice, as each pixel is square, a combination of multiple pixels can't form a standard circle, only being a quasi-circular shape that is close to a circle. Pixels in the quasi-circular shape may be determined in a way below. A circle is drawn around a particular pixel, and pixels in the circle can all be used as pixels in the quasi-circular shape. Further, a preset area ratio is set for pixels on the circumference. If a ratio of an area of a pixel on the circumference inside the circle to a total area of the pixel on the circumference is greater than the preset area ratio, the pixel on the circumference is taken as a pixel in the quasi-circular shape. A size of the circle determines light intensity of the point light source and whether the photoelectric sensing unit can obtain images with higher quality. If the circle is too small, the point light source region is too small, the light will be insufficient. If the circle is too large, the point light source region is too large, which affects imaging quality. Different display panels will also have different light source intensities, and sizes of the point light source regions of different display panels will also be different. For a certain imaging acquisition structure, the size of the point light source region may also be obtained by multiple manual trials. The point light source regions may be lighted according to the sizes of the point light source regions from small to large, and after the photoelectric sensing unit obtains image data, a minimum point light source region that satisfies the imaging quality is selected manually.

Figure 5:
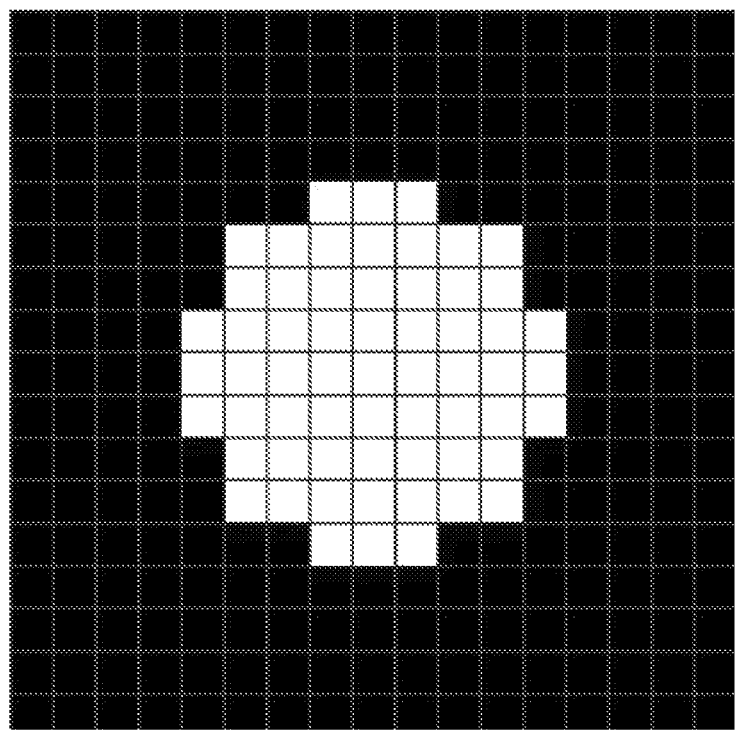
FIG. 5 schematically illustrates a diagram of a pixel according to an embodiment.

In some embodiments, a size and a shape of the point light source region are as shown in FIG. 5 (each grid represents one pixel, and a position where the light source is located is shown in white). A rectangle occupying 7 pixels*7 pixels is disposed in the middle, and there is a protrusion of three pixels at the middle of each side of the rectangle, to enable better imaging quality. A color of the light source may be green, red or a combination of either of the two colors with any other colors, which color may avoid interference from external light.

In some embodiments, the total reflection light signal is received by the photoelectric sensing unit 40 and analyzed to reconstruct an entire image of the fingerprint to be identified.

Besides the total reflection light signal, the photoelectric sensing unit 40 further receives the scattered light signal. If an incident angle of the light from the pixels is smaller than a critical angle θ of total reflection, the light enters the physiological tissue of the finger through the screen 10 and is scattered, and a part of the light returns, to form the scattered light signal (more details can be referred to the above descriptions and are not described here). The scattered light signal is received by the photoelectric sensing unit 40 and analyzed to obtain a heart rate blood oxygen value.

More details about working principles and modes of the fingerprint identification device may be referred to the descriptions of the foregoing embodiments, and are not described in detail here.

In an embodiment of the present disclosure, a terminal including the above fingerprint identification device is provided.

In an embodiment of the present disclosure, a computer readable storage medium having computer instructions stored therein is provided, where once the computer instructions are executed, the above method is performed. The storage medium may be a non-volatile memory or a non-transitory memory. The storage medium may be a Read- Only Memory (ROM), a Random Access Memory (RAM), a magnetic disk or an optical disk.

In an embodiment of the present disclosure, a terminal including a memory and a processor is provided, wherein the memory has computer instructions stored therein, and when the processor executes the computer instructions, the above method is performed. The terminal may include but is not limited to a personal computer, a server, a general-purpose computer, a special-purpose computer, a network device, an embedded device, a programmable device, a smart mobile terminal (such as a mobile phone, an IPAD or a POS machine), a smart home device (such as a smart fingerprint lock), a wearable smart equipment, a vehicular smart equipment, or a fingerprint identification device such as a fingerprint time recorder or a fingerprint attendance machine.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A fingerprint identification method, comprising:
when a touch sensing unit senses a touch signal after a screen is touched by a fingerprint to be identified, a control unit sending a display drive signal to a display unit to light pixels of one or more discrete point light source regions in the display unit; and
a photoelectric sensing unit receiving a scattered light signal formed by light from the pixels reaching a physiological tissue of a finger having the fingerprint to be identified, and a total reflection light signal formed by light from the pixels reaching the screen,
wherein the light from the pixels with an incident angle smaller than a critical angle $\theta$ of total reflection enters the physiological tissue of the finger through the screen and is scattered, and a part of the light returns, to form scattered light, and the scattered light is received by the photoelectric sensing unit and analyzed to obtain a heart rate blood oxygen value,
wherein the light from the pixels with an incident angle greater than or equal to a critical angle $\theta$ of total reflection is totally reflected to form total reflection light, and the total reflection light is received by the photoelectric sensing unit and analyzed to obtain an image of the fingerprint to be identified.

2. The method according to claim 1, wherein wavelength of scattered light is greater than 600 nm.

3. The method according to claim 1, further comprising: determining whether the fingerprint to be identified is a living fingerprint based on the heart rate blood oxygen value.

4. The method according to claim 1, further comprising: determining whether the image of the fingerprint to be identified is consistent with a standard fingerprint image.

5. The method according to claim 1, wherein if the fingerprint to be identified is determined as a living fingerprint based on the heart rate blood oxygen value, and the image of the fingerprint to be identified is determined to be consistent with a standard fingerprint image, fingerprint identification is successful; otherwise, the fingerprint identification is failed.

6. A fingerprint identification device, comprising a screen, a touch sensing unit, a display unit, a photoelectric sensing unit and a control unit,
wherein the screen is configured to be touched by a fingerprint to be identified, the touch sensing unit is configured to sense a touch signal of the fingerprint to be identified,
the display unit is provided with pixels of one or more discrete point light source regions,
the photoelectric sensing unit is configured to receive a scattered light signal formed by light from the pixels reaching a physiological tissue of a finger having the fingerprint to be identified, and a total reflection light signal formed by light from the pixels reaching the screen, and
the control unit is configured to send a display drive signal to the display unit to light the pixels of the one or more discrete point light source regions in the display unit, when the touch sensing unit senses the touch signal,
wherein the light from the pixels with an incident angle smaller than a critical angle $\theta$ of total reflection enters the physiological tissue of the finger through the screen and is scattered, and a part of the light returns, to form scattered light, and the scattered light is received by the photoelectric sensing unit and analyzed to obtain a heart rate blood oxygen value,
wherein the light from the pixels with an incident angle greater than or equal to a critical angle $\theta$ of total reflection is totally reflected to form total reflection light, and the total reflection light is received by the photoelectric sensing unit and analyzed to obtain an image of the fingerprint to be identified.

7. The device according to claim 6, wherein if the fingerprint to be identified is determined as a living fingerprint based on the heart rate blood oxygen value, and the image of the fingerprint to be identified is determined to be consistent with a standard fingerprint image, fingerprint identification is successful; otherwise, the fingerprint identification is failed.

8. A non-transitory computer readable storage medium having computer instructions stored therein, wherein once the computer instructions are executed, the method according to claim 1 is performed.

9. A terminal comprising a memory and a processor, wherein the memory has computer instructions stored therein, and when the processor executes the computer instructions, the method according to claim 1 is performed.

* * * * *